US008699085B2

(12) United States Patent
Shirakata

(10) Patent No.: US 8,699,085 B2
(45) Date of Patent: Apr. 15, 2014

(54) IMAGE FORMING APPARATUS

(75) Inventor: Jiro Shirakata, Chigasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 264 days.

(21) Appl. No.: 13/152,729

(22) Filed: Jun. 3, 2011

(65) Prior Publication Data

US 2011/0311240 A1 Dec. 22, 2011

(30) Foreign Application Priority Data

Jun. 21, 2010 (JP) ................................ 2010-140229

(51) Int. Cl.
*H04N 1/40* (2006.01)

(52) U.S. Cl.
USPC .......................... 358/3.26; 358/3.24; 358/296

(58) Field of Classification Search
USPC ............... 358/3.24-3.26, 496-498, 494, 296, 358/449, 486, 488
See application file for complete search history.

(56) References Cited

U.S. PATENT DOCUMENTS

| | | | | |
|---|---|---|---|---|
| 6,011,948 | A * | 1/2000 | Amano et al. | 399/395 |
| 6,135,447 | A * | 10/2000 | Lin | 271/229 |
| 7,303,191 | B2 | 12/2007 | Takagi et al. | |
| 7,898,695 | B1 * | 3/2011 | Damon et al. | 358/3.26 |
| 2011/0227279 | A1 | 9/2011 | Shirakata | |

FOREIGN PATENT DOCUMENTS

| | | | |
|---|---|---|---|
| JP | 7-33286 | | 2/1995 |
| JP | 08-106186 | A | 4/1996 |
| JP | 2005-53646 | | 3/2005 |
| JP | 2006-276427 | A | 10/2006 |
| JP | 2006-276428 | A | 10/2006 |
| JP | 2006-335516 | A | 12/2006 |
| JP | 2008-105836 | A | 5/2008 |
| JP | 2008-112126 | A | 5/2008 |
| JP | 2008-137739 | A | 6/2008 |
| JP | 4715272 | B2 | 7/2011 |
| JP | 4730288 | B2 | 7/2011 |
| JP | 4778393 | B2 | 9/2011 |

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

There is a need to provide an image forming apparatus capable of preventing a transfer portion from distorting a toner image on a sheet. Line sensors 7A through 7D are provided at least one of between secondary transfer portion 1F and a pair of registration rollers 5 and between a secondary transfer portion 1F and a fixing device 6. The line sensors 7A through 7D continuously detect one end position of a sheet and skew of the sheet with reference to a sheet conveying direction when the sheet passes through the secondary transfer portion 1F. The image forming apparatus computes a distortion amount for a toner image transferred by the secondary transfer portion 1F to a sheet based on detection information from the line sensors 7A through 7D and corrects the toner image formed on an intermediate transfer belt 106 based on a computed distortion amount for the toner image.

8 Claims, 17 Drawing Sheets

IMAGE FORMING APPARATUS

BACKGROUND OF THE INVENTION

1. Field of the Invention

The present invention relates to an image forming apparatus and more particularly to a configuration for preventing a transfer portion from distorting an image on a sheet.

2. Description of the Related Art

Conventionally, an image forming apparatus such as a copying machine, a printer, and a facsimile machine forms a toner image on an image bearing member such as a photosensitive drum and a transfer belt, transfers the toner image to a sheet conveyed to a transfer portion, and then fixes the image on the sheet using a fixing portion. The image forming apparatus is provided with a correction portion that detects the position or skew of a sheet before conveyed to the transfer portion and optimally corrects relative positional relation with a toner image.

For example, a correction portion detects skew of the sheet at the end of the sheet, nips and rotates the skewed sheet to correct the sheet skew (see Japanese Patent Laid-open No. 2005-53646). After correcting the sheet skew, the image forming apparatus having the correction portion computes misalignment between the sheet tip end and the toner image tip end due to the rotation and changes the image timing or the sheet conveying speed to align the toner image with the sheet tip end.

The conventional image forming apparatus having the correction portion corrects distortion of a toner image formed on the sheet by detecting the skew of the sheet and the misalignment of horizontal registration position before the sheet enters the transfer portion. However, the transferred image may be distorted depending on a sheet conveying condition in which the sheet is transferred to the transfer portion and passes through it.

The conventional apparatus cannot detect the conveying state of a sheet passing through the transfer portion even though the apparatus can detect the skew of the sheet and the misalignment of horizontal registration position before the sheet enters the transfer portion. As a result, the toner image is distorted. As discussed in Japanese Patent Laid-Open No. H7-33286, for example, a detection unit is provided near the transfer portion to detect the conveying state of a sheet passing through the transfer portion. The detection unit can detect the conveying state of a sheet to prevent a toner image from being distorted.

In general, upstream and downstream sheet conveying units of the transfer portion simultaneously convey the sheet when passing through the transfer portion. In this state, a velocity difference may occur between the conveying units and stretch or loop the sheet. When the sheet is stretched, the sheet or the toner image is greatly damaged. In many cases, the downstream sheet conveying unit is given a much lower sheet conveying velocity than the upstream sheet conveying unit.

When the velocity difference is provided, however, the sheet is looped between the sheet conveying units. The looped sheet hinders a normal detection operation even though the detection unit is provided near the transfer portion in order to detect the sheet conveying state. The loop condition varies with the skew between the sheet conveying units or a sheet conveying velocity. The loop condition also varies with an installation condition of the image forming apparatus because distortion of the entire image forming apparatus affects the skew between the sheet conveying unit. The sheet conveying velocity of the sheet conveying unit varies with a period of use extended by the wear of the conveying roller, for example. The loop condition chronologically varies with the installation state or the period of use of the image forming apparatus. It is difficult to detect the sheet conveying state at the transfer portion in anticipation of the loop effect.

The present invention has been accomplished in view of such circumstances. The invention provides an image forming apparatus capable of preventing a transfer portion from distorting a toner image on a sheet.

SUMMARY OF THE INVENTION

An image forming apparatus having a transfer portion which transfers a toner image formed on an image bearing member to a sheet, includes an upstream sheet conveying portion provided for the transfer portion upstream in a sheet conveying direction of the sheet, a downstream sheet conveying portion provided for the transfer portion downstream in the sheet conveying direction, a detector which is provided at least one of between the transfer portion and the upstream sheet conveying portion and between the transfer portion and the downstream sheet conveying portion and continuously detects one end position of a sheet in a direction perpendicular to a sheet conveying direction and skew for the sheet conveying direction when the sheet passes through the transfer portion, and a correction portion which corrects a toner image formed on an image bearing member, wherein the correction portion computes a distortion amount for a toner image transferred by the transfer portion to a sheet based on detection information from the detector and corrects the toner image formed on the image bearing member based on a computed distortion amount for the toner image.

The invention can compute a distortion amount for a toner image transferred to a sheet when passing through the transfer portion, correct a toner image formed on an image bearing member based on the computed distortion amount for the toner image, and prevent the transfer portion from distorting the toner image on the sheet.

Further features of the present invention will become apparent from the following description of exemplary embodiments with reference to the attached drawings.

DESCRIPTION OF THE EMBODIMENTS

Figure 1:
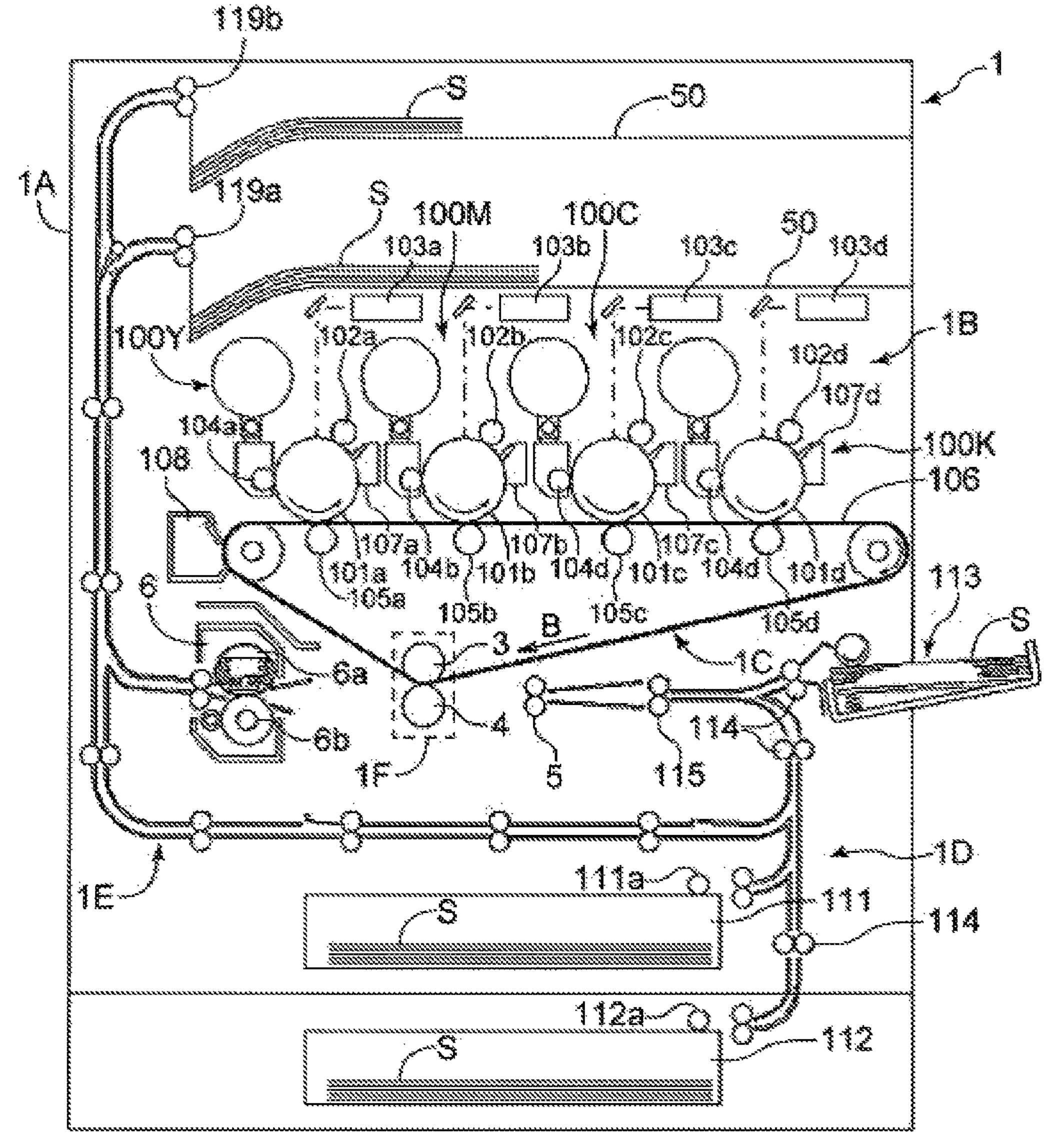
FIG. 1 illustrates an outline configuration of a color laser printer as an example of an image forming apparatus according to a first embodiment of the invention.

Embodiments of the present invention will be described in detail using the drawings. FIG. 1 illustrates an outline configuration of a color laser printer as an example of an image forming apparatus according to a first embodiment of the invention. FIG. 1 illustrates a color laser printer 1 and a laser beam printer body (printer body, hereinafter) 1A as an image forming apparatus body.

The printer body 1A includes an image forming portion 1B for forming an image on a sheet S, an intermediate transfer portion 1C, a secondary transfer portion 1F, a fixing device 6, and a sheet feeding device 1D for feeding the sheet S to the image forming portion 1B. The color laser printer 1 is capable of forming an image on the back face of the sheet. For this purpose, a re-conveying portion 1E reverses the sheet S having an image formed on the surface (first face) and re-conveys the sheet S to the image forming portion 1B.

The image forming portion 1B is almost horizontally positioned and includes four process stations 100 (100Y, 100M, 100C, and 100K) for forming a toner image in four colors, yellow (Y), magenta (M), cyan (C), and black (Bk). The process stations 100 include photosensitive drums 101 (101*a* through 101*d*) as image bearing members that bear a toner image in four colors, i.e., yellow, magenta, cyan, and black, and are driven by a stepping motor (not illustrated). The process stations 100 also include electrification devices 102 (102*a* through 102*d*) that uniformly charge the photosensitive drum surface.

The process stations 100 further include exposures 103 (103*a* through 103*d*) that irradiate a laser beam based on image information and form an electrostatic latent image on the photosensitive drum rotating at a specified speed. The process stations 100 moreover include development devices 104 (104*a* through 104*d*) that apply yellow, magenta, cyan, and black toners to an electrostatic latent image formed on the photosensitive drum and generate a toner image. The electrification devices 102, the exposure device 103, and the development device 104 are placed around the photosensitive drum 101 along the rotation direction.

The sheet feeding device 1D is provided below the printer body and includes sheet cassettes 111 and 112 and pickup rollers 111*a* and 112*a*. The sheet cassettes 111 and 112 are provided as sheet storage portions that store the sheet S. The pickup rollers 111*a* and 112*a* supply the sheet S that is stored in the sheet cassettes 111 and 112. When an image forming operation starts, the pickup rollers 111*a* and 112*a* separately supply the sheets S one by one from the sheet cassettes 111 and 112. The sheet S is then passed through a conveying roller 114 and a pair of pre-registration rollers 115 and is conveyed to a pair of registration rollers 5. The pair of registration rollers 5 corrects skew feeding of the sheet S and conveys the sheet S to the secondary transfer portion 1F at a predetermined timing appropriate to the toner image born on an intermediate transfer belt (to be described).

The intermediate transfer portion 1C includes an intermediate transfer belt 106 that is rotatively driven along an arrangement direction of the process stations 100 marked with an arrow B in synchronization with a circumferential velocity of the photosensitive drum 101. The intermediate transfer belt 106 is inside provided with four primary transfer rollers 105 (105*a* through 105*d*) each of which nips the intermediate transfer belt 106 together with the photosensitive drum 101 and configures a primary transfer portion. The primary transfer rollers 105 are connected to a power supply for transfer bias (not illustrated). The primary transfer roller 105 applies a transfer bias to the intermediate transfer belt 106. Toner images in the respective colors are continuously transferred from the photosensitive drums (image bearing members) to the intermediate transfer belt 106 so as to overlap with each other. As a result, a full color toner image is formed on the intermediate transfer belt 106.

A secondary transfer roller 4 is included in the secondary transfer portion 1F and is provided so as to face an inner transfer roller 3 that supports the intermediate transfer belt 106. The secondary transfer roller 4 abuts the lowest surface of the intermediate transfer belt 106. The secondary transfer roller 4 also nips and conveys the sheet S conveyed from the pair of registration rollers 5 along with the intermediate transfer belt 106. A bias is applied to the secondary transfer roller 4 to secondarily transfer the toner image from the intermediate transfer belt to the sheet S when the sheet S passes through the secondary transfer roller 4 and the secondary transfer portion 1F as a nip portion of the intermediate transfer belt 106. In FIG. 1, a manual sheet feeding portion 113 stores the sheet S. The pickup roller 105*d* selectively feeds the sheet S from the manual sheet feeding portion 113 to the secondary transfer portion.

The following describes an image forming operation of the color laser printer 1 according to the above-described configuration. When the image forming operation starts, the process station 100Y first allows the exposure device 103*a* to irradiate laser to the photosensitive drum 101*a* and form a yellow latent image on the photosensitive drum. This is because the process station 100Y is positioned most upstream in the rotation direction of the intermediate transfer belt 106. The development device 104*a* then develops the latent image using the yellow toner to form a yellow toner image. The primary transfer roller 105*a* is supplied with a high voltage and primarily transfers the yellow toner image from the photosensitive drum 101*a* to the intermediate transfer belt 106 in the primary transfer region.

The toner image is conveyed to the primary transfer region along with the intermediate transfer belt 106. The primary transfer region includes the photosensitive drum 101*b* and the transfer roller 105*b* for the following process station 100M. The following magenta toner image is transferred to the yellow toner image on the intermediate transfer belt in alignment with the tip end of the toner image. The similar process is repeated subsequently. As a result, the four-color toner images are primarily transferred to the intermediate transfer belt 106 to form a full color toner image on the intermediate transfer belt. Photosensitive cleaners 107 (107*a* through 107*d*) collect residual transfer toner slightly remaining on the photosensitive drum. The collected toner is used for the following toner image formation.

For example, the sheets S are stored in the sheet cassettes 111 and 112 in parallel with the toner image forming operation. The pickup rollers 111_a_ and 112_a_ separately feed the sheets S one by one. The sheet S passes through the conveying roller 114 and the pre-registration roller 115 and is conveyed to the pair of registration rollers 5. The sheet S is conveyed to the pair of registration rollers 5 also when the pickup roller 105_d_ selectively feeds the sheets S stored in the manual sheet feeding portion 113. The pair of registration rollers 5 corrects skew feeding of the sheet S. After correcting the skew feeding, the pair of registration rollers 5 conveys the sheet S to the secondary transfer portion 1F. When the sheet S passes through the secondary transfer portion 1F, a bias is applied to the secondary transfer roller 4 to secondarily transfer the toner image from the intermediate transfer belt to the sheet S.

The pair of registration rollers 5 conveys sheets to the secondary transfer portion 1F at a conveying velocity much lower than a peripheral speed (process velocity) of the image forming portion 1B including the photosensitive drums 101 and the intermediate transfer belt 106. For example, the embodiment assumes the process velocity for plain paper to be 150 mm/s and the sheet conveying velocity to be 150.5 mm/s. An intermediate transfer member cleaner 108 collects residual transfer toner that is not transferred in the secondary transfer portion 1F and remains on the intermediate transfer belt 106.

After the secondary transfer portion 1F secondarily transfers the toner image to the sheet S, the sheet S is conveyed to the fixing device 6. The fixing device 6 allows a fixing roller 6_a_ and a pressure roller 6_b_ to melt and fix the toner image on the sheet by heating and pressing. Discharge rollers 119_a_ and 119_b_ then discharge the sheet S to a discharge tray 50 provided at the top of the printer body. In duplex mode, the sheet S where the toner image is fixed is conveyed to the re-conveying portion 1E, passes through the pair of registration rollers 5, and is conveyed to the secondary transfer portion 1F. The subsequent image forming process for the back face (second face) is similar to that for the surface (first face) as described above.

Figure 2A:
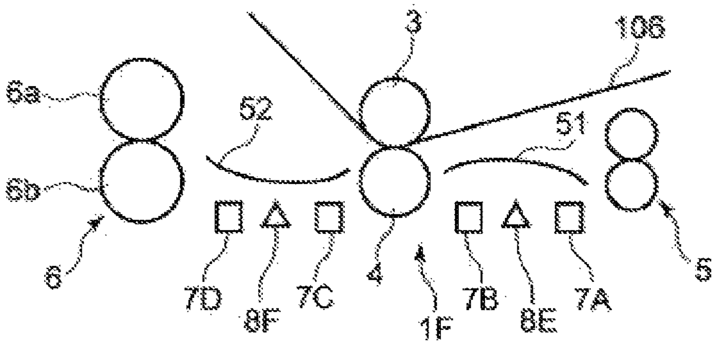
FIG. 2A is a schematic sectional view near a secondary transfer portion of the color laser printer.
Figure 2B:
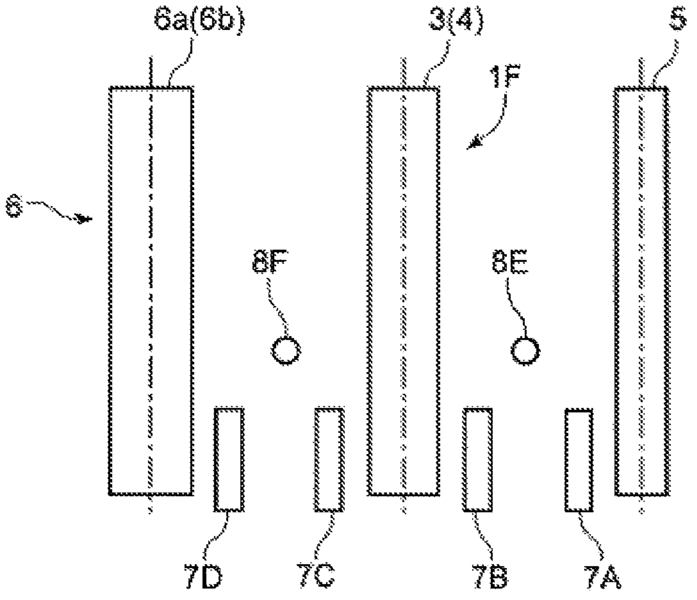
FIG. 2B is a top view near the secondary transfer portion of the color laser printer.

As illustrated in FIGS. 2A and 2B, line sensors 7A and 7B are provided between the secondary transfer portion 1F and the pair of registration rollers 5. The line sensors 7A and 7B configure a detector that continuously detects one end position (width registration position) of a sheet in the width direction perpendicular to the sheet conveying direction and the skew of a sheet with reference to the sheet conveying direction.

A gap sensor 8E is provided between the secondary transfer portion 1F and the pair of registration rollers 5 and functions as a loop amount detector. The gap sensor 8E detects a loop amount when a sheet loops between the secondary transfer portion 1F and the pair of registration rollers 5 due to a velocity difference between the process velocity and the pair of registration rollers 5. Line sensors 7C and 7D and a gap sensor 8F are provided between the secondary transfer portion 1F and the fixing device 6. FIG. 2A illustrates guides 51 and 52.

As described above, the pair of registration rollers 5 is provided as an upstream sheet conveying portion for the secondary transfer portion 1F upstream in the sheet conveying direction. The sheet S conveyed from the pair of registration rollers 5 is then conveyed to the secondary transfer portion 1F. At that time, the pair of registration rollers 5 may skew against the secondary transfer roller 4 and the inner transfer roller 3 included in the secondary transfer portion 1F. For example, there may be a case where the pair of registration rollers 5 indicates different roller diameters in the axial direction or the roller may be deformed at the nip portion. In such a case, the nip portion causes a different conveying radius even when the pair of registration rollers 5 does not skew.

Figure 2C:
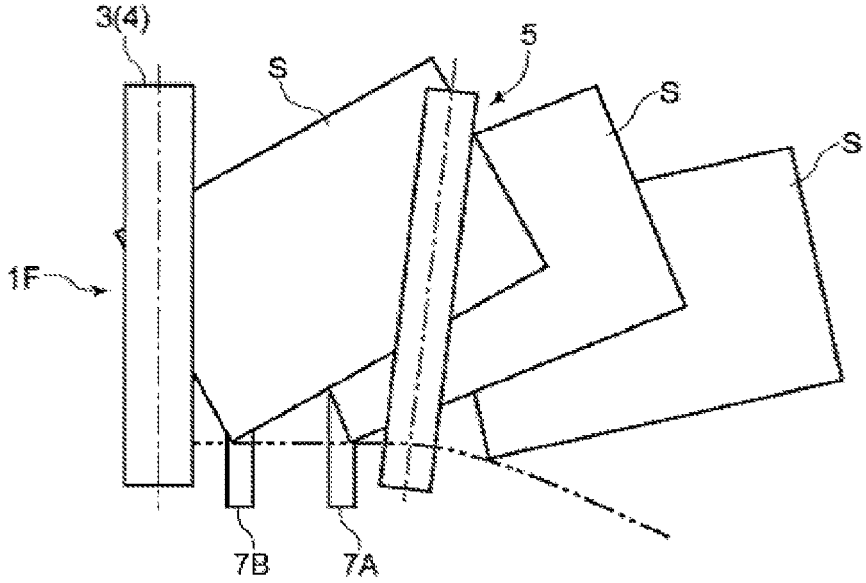
FIG. 2C illustrates a sheet conveying state.

When the pair of registration rollers 5 skews or the conveying radiuses differ in the axial direction, the pair of registration rollers 5 conveys the sheet S by rotating it as illustrated in FIG. 2C. When the sheet S rotates, the secondary transfer portion 1F transfers a distorted toner image. When a sheet does not loop, simultaneously and continuously detecting horizontal registration positions of the sheet and the skew of the sheet in the sheet conveying direction can compute the toner image distortion on the sheet.

Figure 3A:
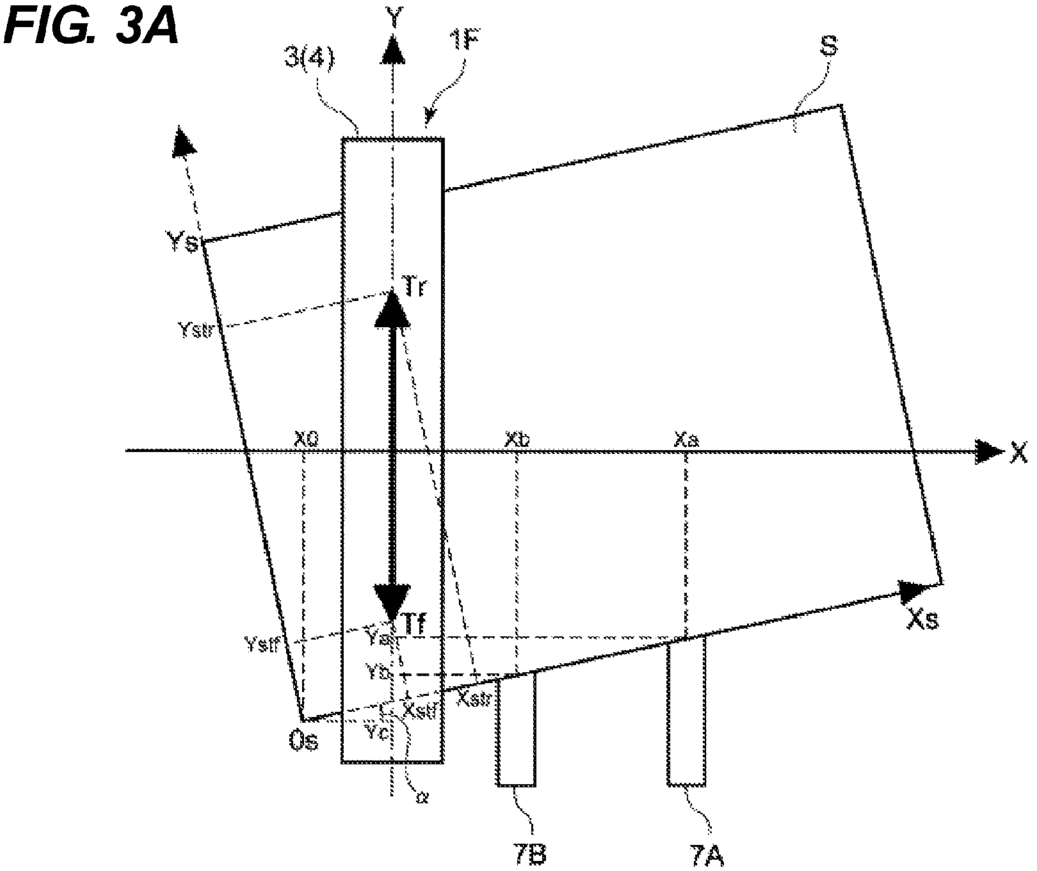
FIG. 3A illustrates how to compute distortion of a toner image on a sheet for the color laser printer.

An example of the computation method will be described with reference to FIG. 3A. In FIG. 3A, a global coordinate system (X, Y) is assumed using the axial direction center of the secondary transfer portion 1F as an origin. A local coordinate system (Xs, Ys) is assumed on the sheet using a nearer corner Os at the sheet tip end as an origin. The local coordinate system (Xs, Ys) provides a moving coordinate system that moves with the conveyed sheet.

It is assumed that the secondary transfer portion 1F provides an image transfer portion (toner image forming portion) with nearer corner Tf and farther corner Tr. The corresponding coordinates in the (X, Y) coordinate system are represented as follows. The corners are used as fixed points in the (X, Y) coordinate system.

$$(Xtf, Ytf) \quad (1)$$

$$(Xtr, Ytr) \quad (2)$$

The following shows coordinates in the (X, Y) coordinate system where the line sensors 7A and 7B detect the horizontal registration of the sheet S at time t. The X coordinate represents a constant because the sensor position is fixed. The Y coordinate varies with the sheet conveyance and therefore represents the function of time t.

$$(Xa, Ya(t)) \quad (3)$$

$$(Xb, Yb(t)) \quad (4)$$

Let us suppose that the nearer corner Os at the sheet tip end reaches the line sensor 7B at time t=0 and the sheet conveying velocity is V. Based on the coordinates (3) and (4), the line sensors 7A and 7B detect the following coordinates for the horizontal registration of the sheet S at time t=tp.

$$(Xa, Ya(tp)) \quad (5)$$

$$(Xb, Yb(tp)) \quad (6)$$

Let us suppose that the nearer corner Os at the sheet tip end corresponds to coordinates (Xo(tp), Yo(tp)) in the (X, Y) coordinate system. Then, the X coordinate Xo is found as follows.

$$Xo(tp)=Xb-V*tp \quad (7)$$

The Y coordinate Yo is found as follows.

$$Yo(tp)=\{[Yb(tp)-Ya(tp)]/(Xb-Xa)\}*(Xo-Xa)+Ya(tp) \quad (8)$$

As illustrated in FIG. 3, skew α between the (X, Y) coordinate system and the (Xs, Ys) coordinate system is equivalent to the skew of the sheet. Therefore, skew α(tp) at time t=tp is calculated as follows.

$$\alpha(tp)=\mathrm{TAN}((Yb(tp)-Ya(tp))/(Xb-Xa)) \quad (9)$$

The toner image transfer position on the sheet at time t=tp can be found by converting the toner image transfer portion coordinates (1) and (2) into the local coordinate system (Xs, Ys) on the sheet.

The vector from Os to Tf in the global coordinate system is found as follows.

$$(Xtf-Xo(tp),Ytf-Yo(tp)) \quad (10)$$

The vector from Os to Tr in the global coordinate system is found as follows.

$$(Xtr-Xo(tp),Ytr-Yo(tp)) \quad (11)$$

Rotating these vectors by $-\alpha$ can find each point in the local coordinate (Xs, Ys) as follows.

$$Xstf(tp)=(Xtf-Xo(tp))*\mathrm{COS}(-\alpha(tp))-(Ytf-Yo(tp))*\mathrm{SIN}(-\alpha(tp)) \quad (12)$$

$$Ystf(tp)=(Xtf-Xo(tp))*\mathrm{SIN}(-\alpha(tp))+(Ytf-Yo(tp))*\mathrm{COS}(-\alpha(tp)) \quad (13)$$

$$Xstr(tp)=(Xtr-Xo(tp))*\mathrm{COS}(-\alpha(tp))-(Ytr-Yo(tp))*\mathrm{SIN}(-\alpha(tp)) \quad (14)$$

$$Ystr(tp)=(Xtr-Xo(tp))*\mathrm{SIN}(-\alpha(tp))+(Ytr-Yo(tp))*\mathrm{COS}(-\alpha(tp)) \quad (15)$$

Figure 3B:
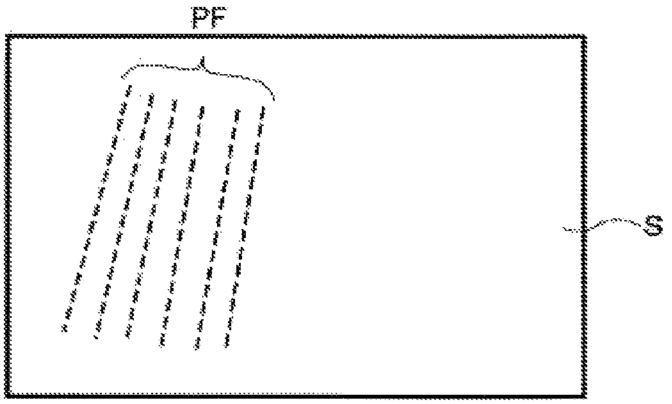
FIG. 3B illustrates a toner image distortion profile.

As described above, the detection information from the line sensor 7 at time tp determines the transfer position on the sheet. Performing the detection and the calculation at a predetermined time interval can generate a distortion profile PF as illustrated in FIG. 3B for toner images transferred onto the sheet. A fixing nip portion may skew between the fixing roller 6*a* and the pressure roller 6*b* of the fixing device 6 as the downstream sheet conveying portion provided for the secondary transfer portion 1F downstream in the sheet conveying direction. The fixing roller 6*a* and the pressure roller 6*b* may be deformed at the nip portion. In such a case, the toner image is distorted. Also in this case, simultaneously and continuously detecting horizontal registration positions of the sheet and the skew of the sheet in the sheet conveying direction can compute the toner image distortion on the sheet.

Figure 4A:
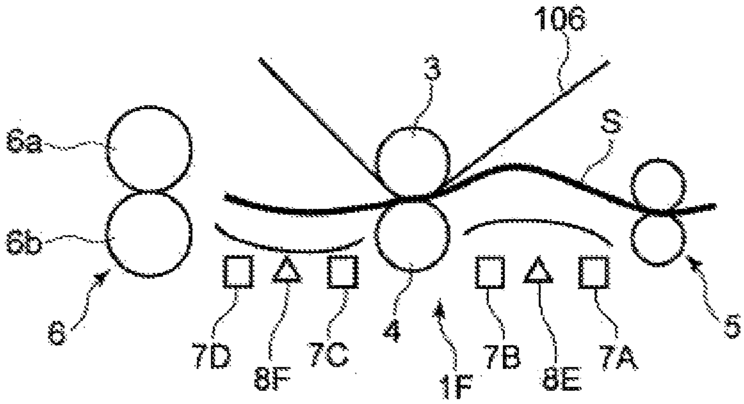
FIG. 4A illustrates how a loop is caused near the secondary transfer portion of the color laser printer downstream in a sheet conveying direction of the secondary transfer portion.

As illustrated in FIG. 4A, a difference between the sheet conveying velocity of the pair of registration rollers 5 and the process velocity loops the sheet S upstream in the sheet conveying direction for the secondary transfer portion 1F. The lopped sheet S passes far away from the line sensors 7A and 7B and degrades the detection accuracy of the line sensors 7A and 7B. A difference between the sheet conveying velocity of the fixing device 6 and the process velocity may loop the sheet S downstream in the sheet conveying direction for the secondary transfer portion 1F. Also in this case, the detection accuracy of the line sensors 7C and 7D degrades. As a result, a large error results from the toner image distortion profile computed based on the detected horizontal registration position.

Figure 4B:
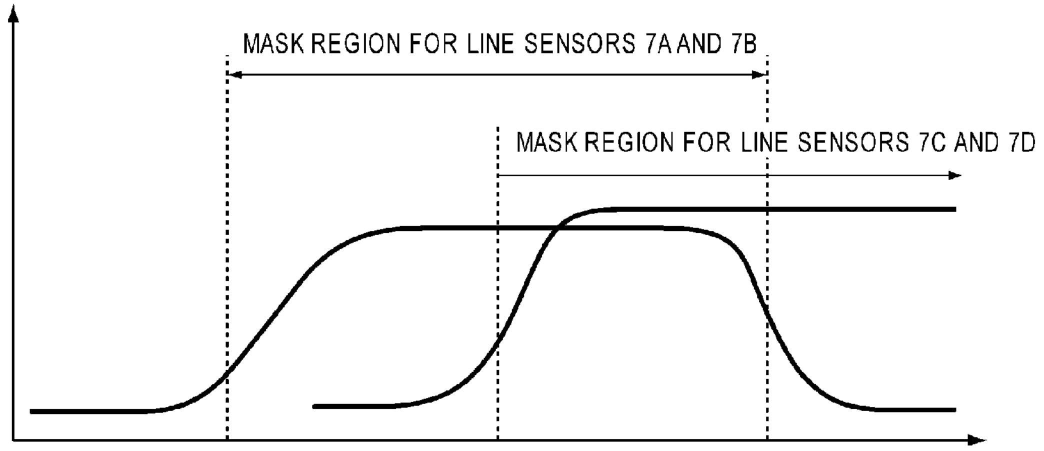
FIG. 4B illustrates line sensor mask regions.
Figure 4C:
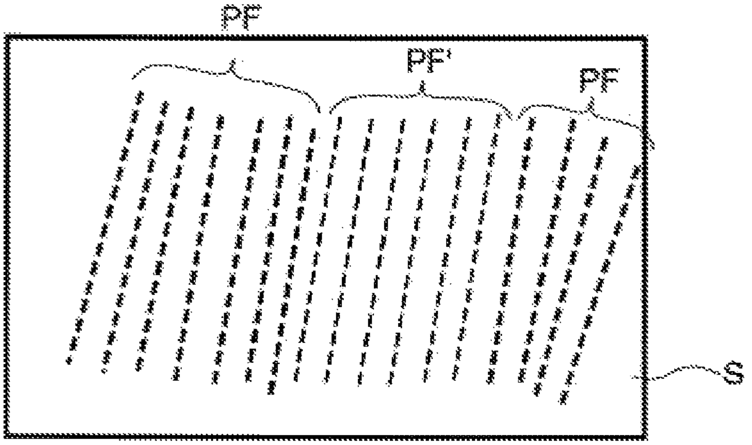
FIG. 4C illustrates a corrected profile.

To solve this problem, the embodiment disables computation of the toner image distortion profile when the value for the gap sensors 8E and 8F as loop amount detection units exceeds a predetermined value. As illustrated in FIG. 4B, there are provided mask regions that mask signals from the line sensors 7A and 7B and the line sensors 7C and 7D. As illustrated in FIG. 4C, the toner image distortion profile corresponding to the mask regions is corrected based on the preceding and succeeding toner image distortion profiles PF. FIG. 4C also illustrates a corrected profile PF'.

Correcting the toner image distortion profile based on values from the gap sensors 8E and 8F can increase a region capable of detecting and computing misalignment, skew, and distortion of a toner image at the secondary transfer portion 1F independently of a loop effect. Such a region can be ensured at a maximum even when a loop occurrence region changes chronologically.

The computed toner image distortion profile varies with variations in each image formation, a difference specific to the printer body 1A, rise in temperature, and movement of the printer body 1A. According to the embodiment, a profile is computed for each image formation and is saved in a memory portion as a storage unit to be described with reference to FIG. 5. When a predetermined number of profiles is saved, the saved profiles are averaged. Variations in each image formation are filtered to generate data that is then used as a typical profile.

Figure 5:
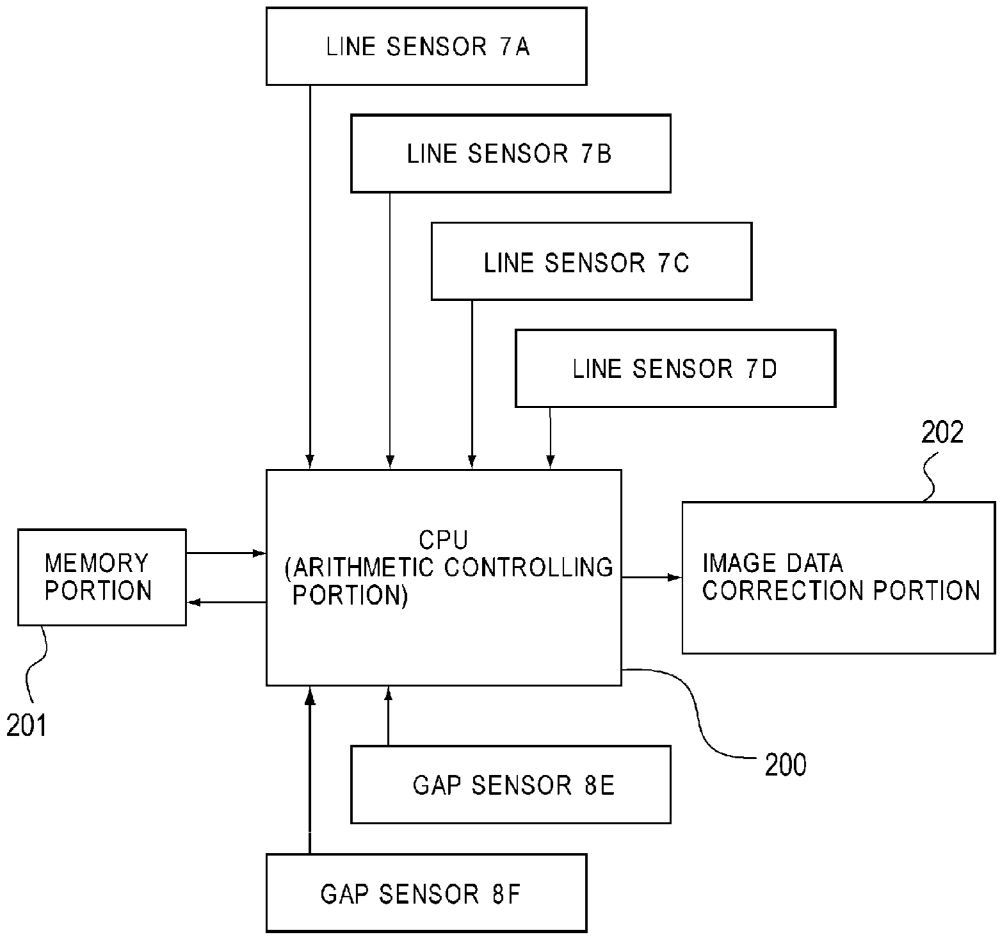
FIG. 5 is a control block diagram of the color laser printer.

FIG. 5 is a control block diagram of the color laser printer 1. FIG. 5 illustrates a CPU (arithmetic controlling portion) 200 as a controlling portion. The CPU 200 connects with the line sensors 7A through 7D and the gap sensors 8E and 8F. The CPU 200 is supplied with a horizontal registration position signal from the line sensors 7A through 7D and a gap signal indicative of the gap amount from the gap sensors 8E and 8F.

The CPU 200 uses signals continuously supplied from the line sensors 7A through 7D to detect the horizontal registration position and the skew against the sheet conveying direction of a sheet that passes through the secondary transfer portion 1F. The CPU 200 also connects with a memory portion 201 and an image data correction portion 202.

The memory portion 201 saves distortion profile data to be described below. The image data correction portion 202 corrects image data for image formation based on the typical distortion profile. The CPU 200 saves distortion profile data in the memory portion 201 each time an image is formed. The CPU 200 computes a typical distortion profile from the saved distortion profile data and corrects image data using the typical distortion profile.

Figure 6A:
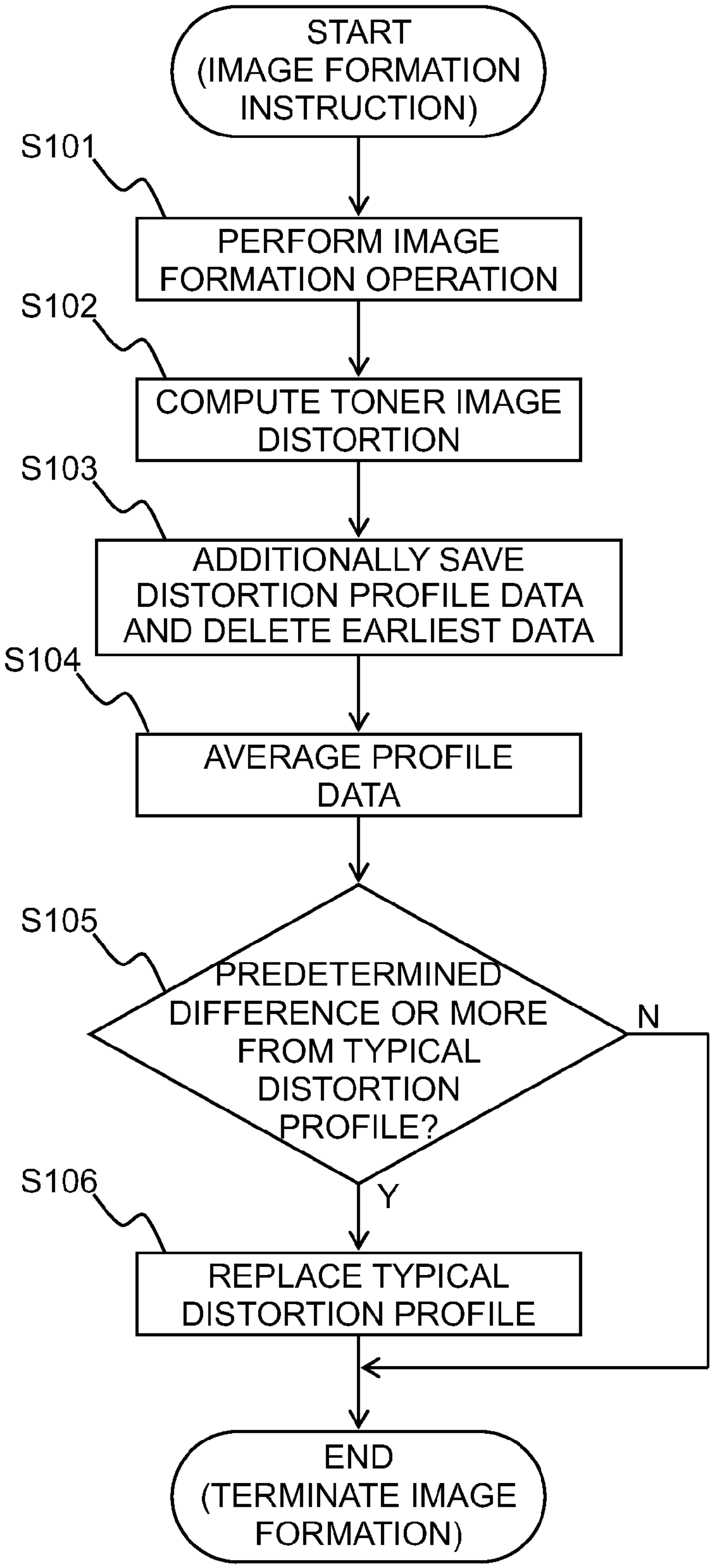
FIG. 6A is a flowchart illustrating how to compute a typical distortion profile for the color laser printer.

The following describes an operation of computing the typical distortion profile with reference to a flowchart in FIG. 6A. When supplied with an image formation instruction, the CPU 200 starts an image formation operation (S101). The CPU 200 functions as a correction portion that corrects a toner image formed on the photosensitive drum 101 and the intermediate transfer belt 106. The CPU 200 computes toner image distortion based on data detected by the line sensor 7 and the gap sensor 8 (S102) to compute a distortion profile for the toner image. The CPU 200 additionally saves the computed distortion profile data in the memory portion 201. The distortion profile data is continuously saved. The saved data is deleted from the earliest one after the memory portion has stored a predetermined number of computed profiles (S103). The CPU 200 additionally saves distortion profile data and deletes the earliest data to keep the distortion profile data up-to-date.

The CPU 200 averages pieces of saved profile data (S104). Averaging pieces of profile data computes a candidate for the typical distortion profile. The CPU 200 compares the computed candidate for the typical distortion profile with the saved typical distortion profile. The CPU 200 determines whether a predetermined difference or more is found between the computed candidate for the typical distortion profile and the saved typical distortion profile (S105).

The comparison may result in a predetermined difference or more between the computed candidate for the typical distortion profile and the saved typical distortion profile (Y at S105). In this case, the CPU 200 determines that the typical distortion profile changes chronologically. The CPU 200 replaces the saved typical distortion profile with the candidate profile (S106). The CPU 200 determines the candidate profile as a new typical distortion profile and then terminates the image formation operation. The comparison may not result in a predetermined difference or more between the computed candidate for the typical distortion profile and the saved typical distortion profile (N at S105). In this case, the CPU 200 terminates the image formation operation after the comparison. Even after the printer body 1A is powered off, the pieces of profile data and the typical profile data are saved and take effect each time an image formation instruction is input.

Figure 6B:
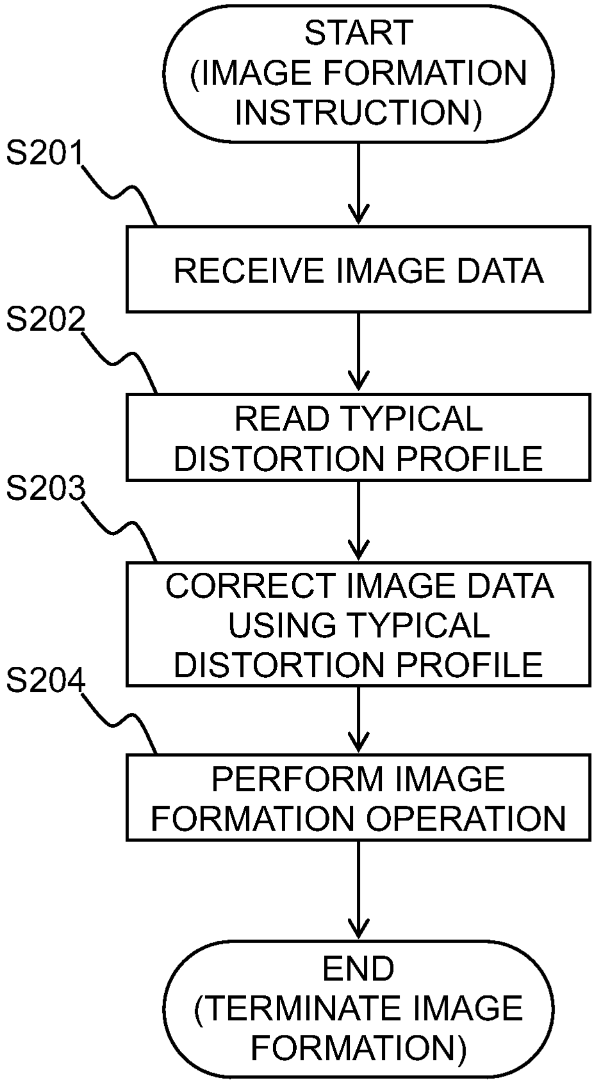
FIG. 6B is a flowchart illustrating an image data correction operation.

Image data before printing is corrected based on the computed typical distortion profile for the image data. The image data correction can ensure an excellent image with minimal toner image distortion. The following describes the image data correction operation with reference to a flowchart in FIG. 6B.

The CPU 200 is supplied with an image formation instruction and receives image data for the image formation (S201). The CPU 200 then reads the typical distortion profile from the memory portion 201 (S202). The image data correction portion 202 corrects the image data based on the typical distortion profile (S203). According to the embodiment, the correction supplies designed distortion as image data in order to cancel the toner image distortion on the sheet computed from the typical distortion profile. Specifically, bitmap data for the original image is repositioned so that the typical distortion profile as illustrated in FIG. 4C ensures an ideal position free from skew against the sheet conveying direction.

The CPU 200 performs the image formation operation using the corrected image data (S204). An excellent toner image without distortion is output to the sheet. Terminating one-time image formation operation completes the above-described steps. The following image formation operation reads the most recent typical distortion profile.

As described above, the embodiment uses data detected by the line sensor 7 and the gap sensor 8 to correct a toner image to be formed on the photosensitive drum 101 and the intermediate transfer belt 106 according to the horizontal registration position and the skew of the sheet. This method can prevent the secondary transfer portion 1F from distorting a toner image on the sheet and ensure an excellent image with minimal toner image distortion.

Figure 7A:
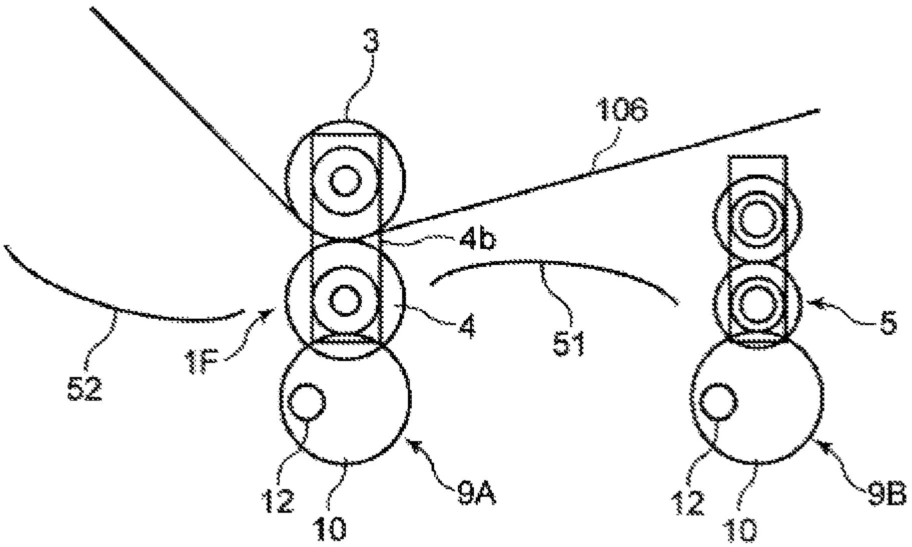
FIG. 7A illustrates a configuration near the secondary transfer portion provided for an image forming apparatus according to a second embodiment of the invention.

Next, a second embodiment of the invention will be described. FIG. 7A illustrates a configuration near the secondary transfer portion provided for the image forming apparatus according to the embodiment. In FIG. 7, the same symbols as those in FIG. 4 represent the same or corresponding portions.

Figure 7B:
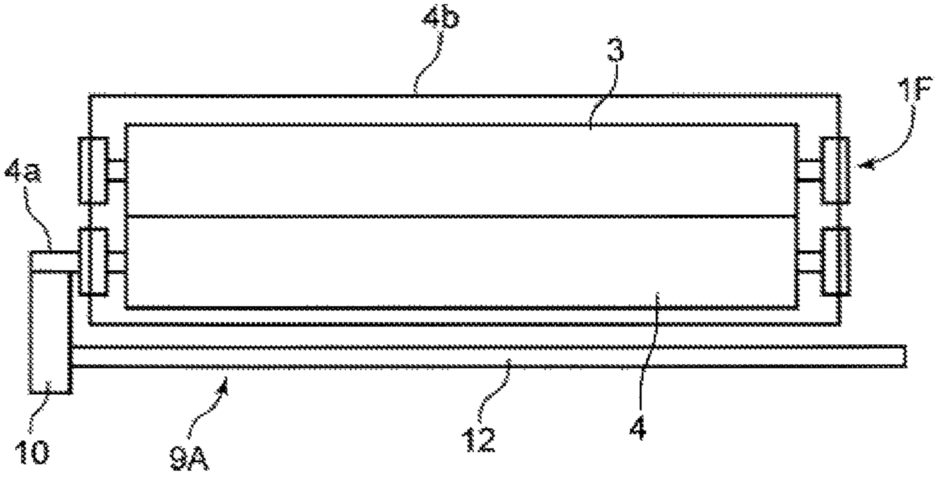
FIG. 7B is a front view near the secondary transfer portion.

FIGS. 7A and 7B illustrate first and second sheet nip pressure adjusting portions 9A and 9B. The first and second sheet nip pressure adjusting portions 9A and 9B are attached to the secondary transfer portion 1F and the pair of registration rollers 5, respectively. For example, the first sheet nip pressure adjusting portion 9A abuts a shaft 4*a* of the secondary transfer roller 4 and includes a cam follower 10 rotated by a rotation shaft 12. A bearing 4*b* vertically rotatively supports the shaft 4*a* of the secondary transfer roller 4.

The rotation shaft 12 rotates the cam follower 10 to vertically rotate the shaft 4*a* of the secondary transfer roller 4. The secondary transfer roller 4 also vertically rotates while being pressed against the inner transfer roller 3 through the intermediate transfer belt 106. The secondary transfer roller 4 vertically rotates to adjust a nip pressure difference between the secondary transfer roller 4 and the inner transfer roller 3 in the axial direction.

The second sheet nip pressure adjusting portion 9B also includes the cam follower 10 rotated by the rotation shaft 12. The rotation shaft 12 rotates the cam follower 10 to adjust a nip pressure difference between the pair of registration rollers 5 in the axial direction. Changing the nip pressures can change sheet conveying velocities of the secondary transfer portion 1F and the pair of registration rollers 5 in the axial direction. As a result, the sheet is given a rotative element. In other words, changing the nip pressures of the secondary transfer portion 1F and the pair of registration rollers 5 in the axial direction can supply a rotative element to the sheet while passing through the secondary transfer portion 1F and the pair of registration rollers 5.

Figure 8:
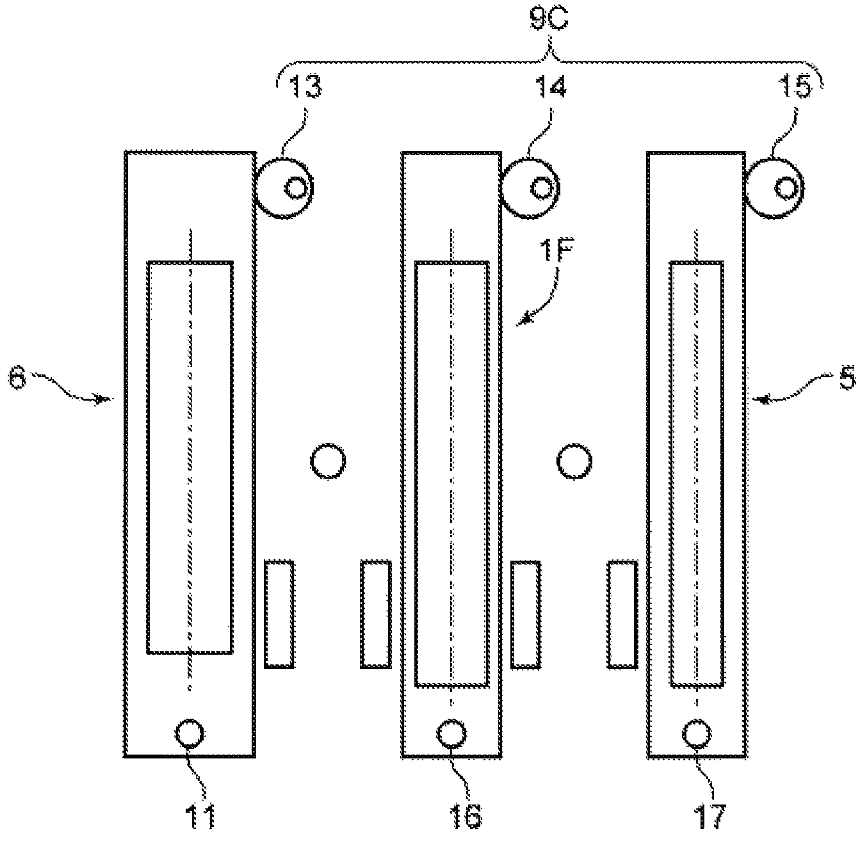
FIG. 8 illustrates a configuration of an alignment adjusting portion provided for the image forming apparatus.

FIG. 8 illustrates a configuration of an alignment adjusting portion for adjusting skews for the fixing device 6, the secondary transfer portion 1F, and the pair of registration rollers 5 in the sheet conveying direction. According to the embodiment, the fixing device 6, the secondary transfer portion 1F, and the pair of registration rollers 5 are freely rotative around rotation shafts 11, 16, and 17. In FIG. 8, a cam follower 13 presses against the fixing device 6. A cam follower 14 presses against the secondary transfer portion 1F. A cam follower 15 presses against the pair of registration rollers 5. An alignment adjusting portion 9C rotates the cam followers 13 through 15 to adjust relative skews among the fixing device 6, the secondary transfer portion 1F, and the pair of registration rollers 5.

Figure 9:
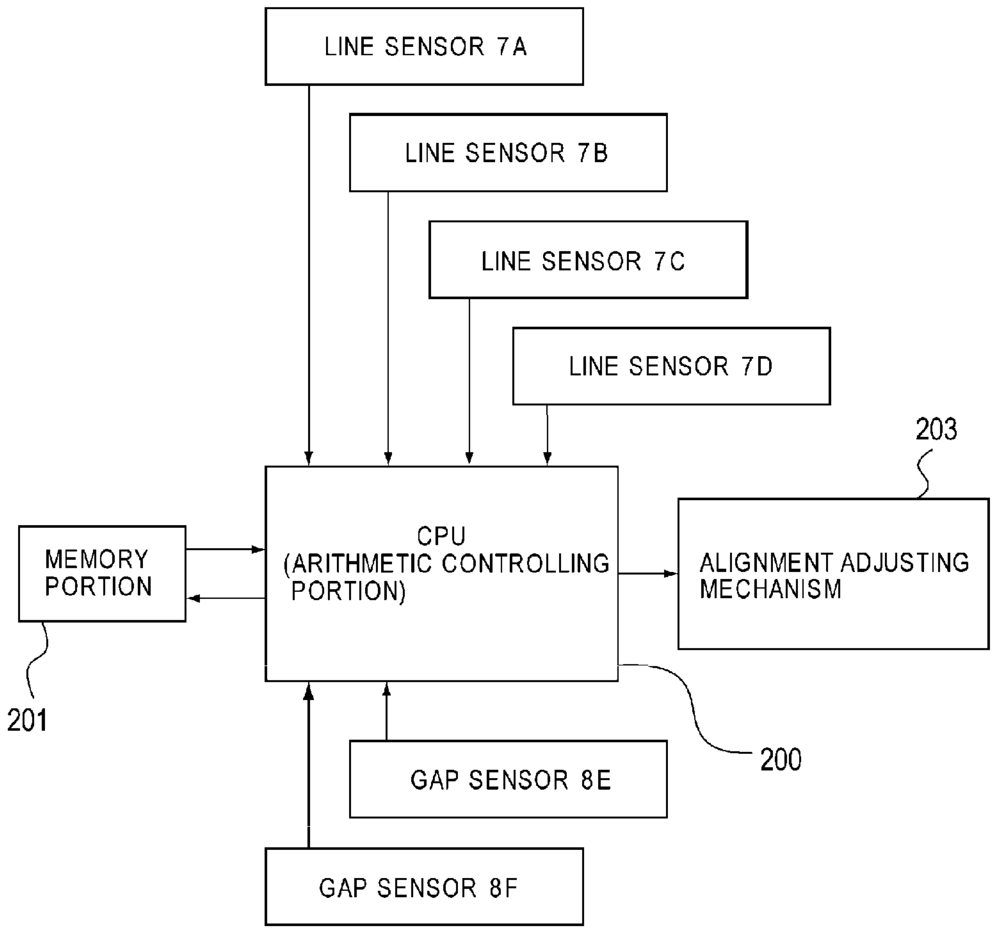
FIG. 9 is a control block diagram of the image forming apparatus.

FIG. 9 is a control block diagram of the image forming apparatus according to the embodiment. In FIG. 9, the same symbols as those in FIG. 5 represent the same or corresponding portions. In FIG. 9, an alignment adjusting mechanism 203 operates based on the computed typical distortion profile for toner images and controls the first and second sheet nip pressure adjusting portions 9A and 9B and the alignment adjusting portion 9C as a skew adjusting portion. The alignment adjusting mechanism 203 allows the sheet nip pressure adjusting portions 9A and 9B to adjust the sheet nip pressure and allows the alignment adjusting portion 9C to adjust the alignment (skew). As a result, an image with minimal toner image distortion can be generated.

Figure 10:
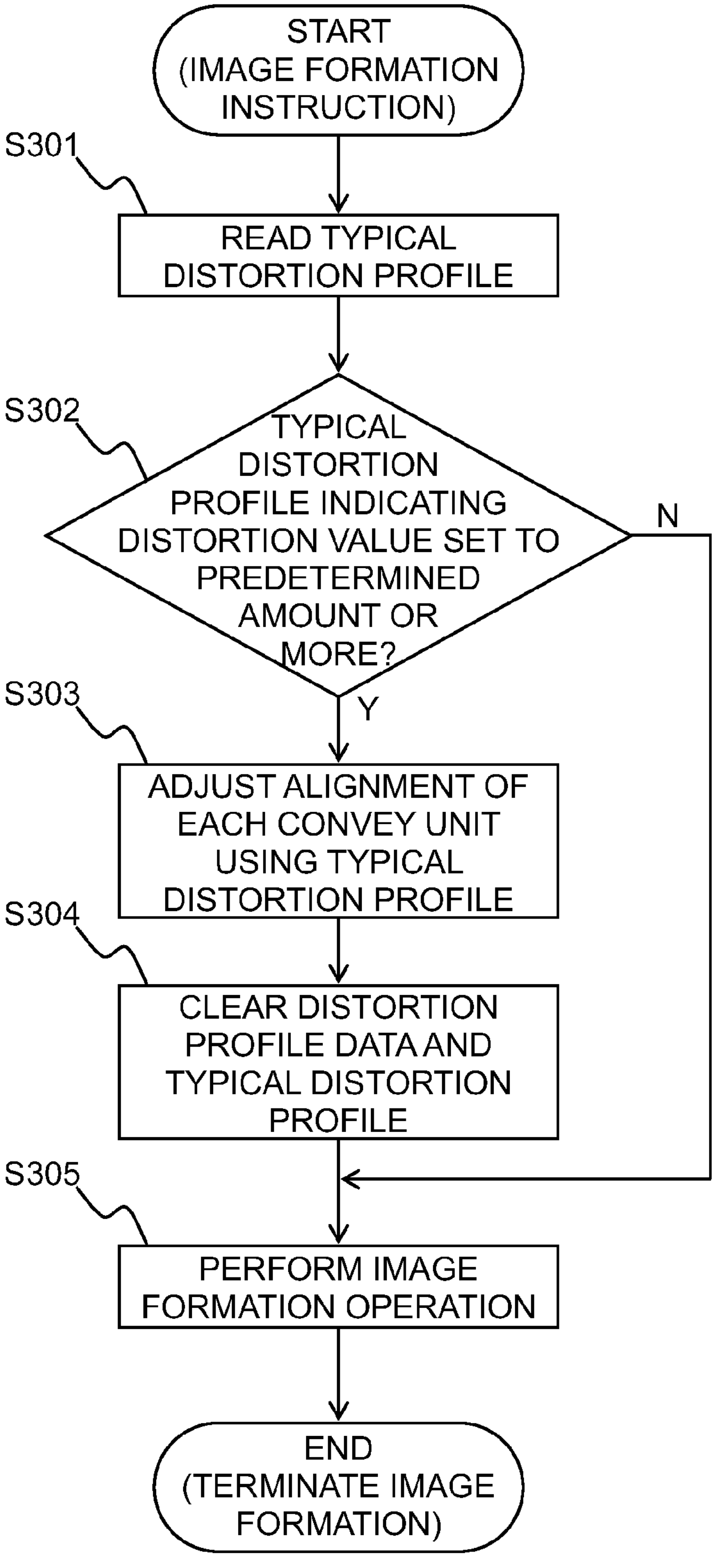
FIG. 10 is a flowchart illustrating adjusting operations for sheet nip pressure and alignment on the image forming apparatus.

The following describes operations of adjusting the sheet nip pressure and the alignment according to the embodiment with reference to a flowchart in FIG. 10. As described above, the CPU 200 is supplied with an image formation instruction and reads the typical distortion profile stored in the memory portion 201 (S301). The CPU 200 determines whether the size (distortion value) of the typical distortion profile corresponds to a predetermined value or larger (S302). When the typical distortion profile size is larger than or equal to a predetermined value (Y at S302), the CPU 200 allows the first and second sheet nip pressure adjusting portions 9A and 9B to adjust nip pressures of the secondary transfer portion 1F and the pair of registration rollers 5 according to the profile size. The CPU 200 allows the alignment adjusting portion 9C to perform an alignment adjusting operation for adjusting relative skews among the fixing device 6, the secondary transfer portion 1F, and the pair of registration rollers 5.

The typical distortion profile is used to compute an adjustment value as follows. The mask region information for the line sensor 7 as illustrated in FIG. 4B is used to extract a sheet conveying unit that chiefly relates to the distortion state associated with the typical distortion profile. For example, the mask region for the line sensor 7 illustrated in FIG. 4B is applied to the typical distortion profile illustrated in FIG. 4C to extract coverage regions for the sheet conveying units as illustrated in FIG. 11.

Figure 11:
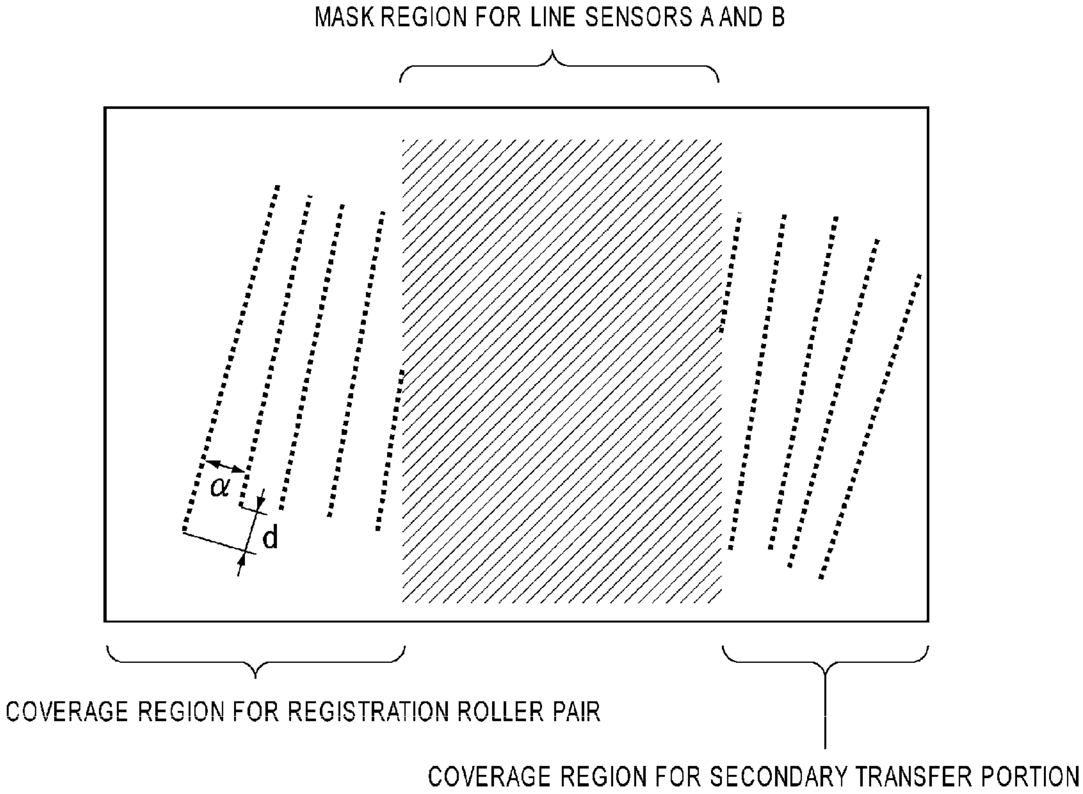
FIG. 11 illustrates an image distortion profile for the image forming apparatus.

In FIG. 11, a registration roller coverage region allows the pair of registration rollers 5 to convey the sheet and causes a loop smaller than or equal to the predetermined amount between the pair of registration rollers 5 and the secondary transfer portion 1F. A transfer portion coverage region allows the secondary transfer portion 1F to chiefly convey the sheet that is conveyed past the pair of registration rollers 5.

Skew and distortion information about the toner image is extracted from these regions to adjust the nip pressure and the alignment for the corresponding sheet conveying unit. As each adjustment value, for example, a rotative element of the sheet is computed from an angle α illustrated in FIGS. 11 and 3A. The nip pressure for the pair of registration rollers 5 is changed according to the computed rotative element of the sheet so that the angle α is adjusted to 0. As illustrated in FIG. 11, d is used to compute the relative skew between the pair of registration rollers 5 and the transfer portion 1. The cam follower 15 for alignment adjustment corresponding to the pair of registration rollers 5 is rotated so that the computed relative skew is adjusted to 0.

Conveying unit alignment is performed once on each of the secondary transfer portion 1F and the pair of registration rollers 5 based on the typical distortion profile (S303). The CPU 200 clears pieces of distortion profile data and the typical distortion profile saved in the memory portion 201 (S304). An image is formed subsequently (S305) to generate an excellent toner image with minimal distortion. After the distortion profile data is cleared from the memory portion 201, the CPU 200 restarts collecting and computing data according to the process in FIG. 6A.

According to the embodiment, the sheet nip pressure adjusting portions 9A and 9B adjust nip pressures of the secondary transfer portion 1F and the pair of registration rollers 5. The alignment adjusting portion 9C adjusts relative skews for the secondary transfer portion 1F and the pair of registration rollers 5. As a result, a toner image formed on the photosensitive drum 101 and the intermediate transfer belt 106 can be corrected. An excellent toner image with minimal distortion can be generated.

Figure 12:
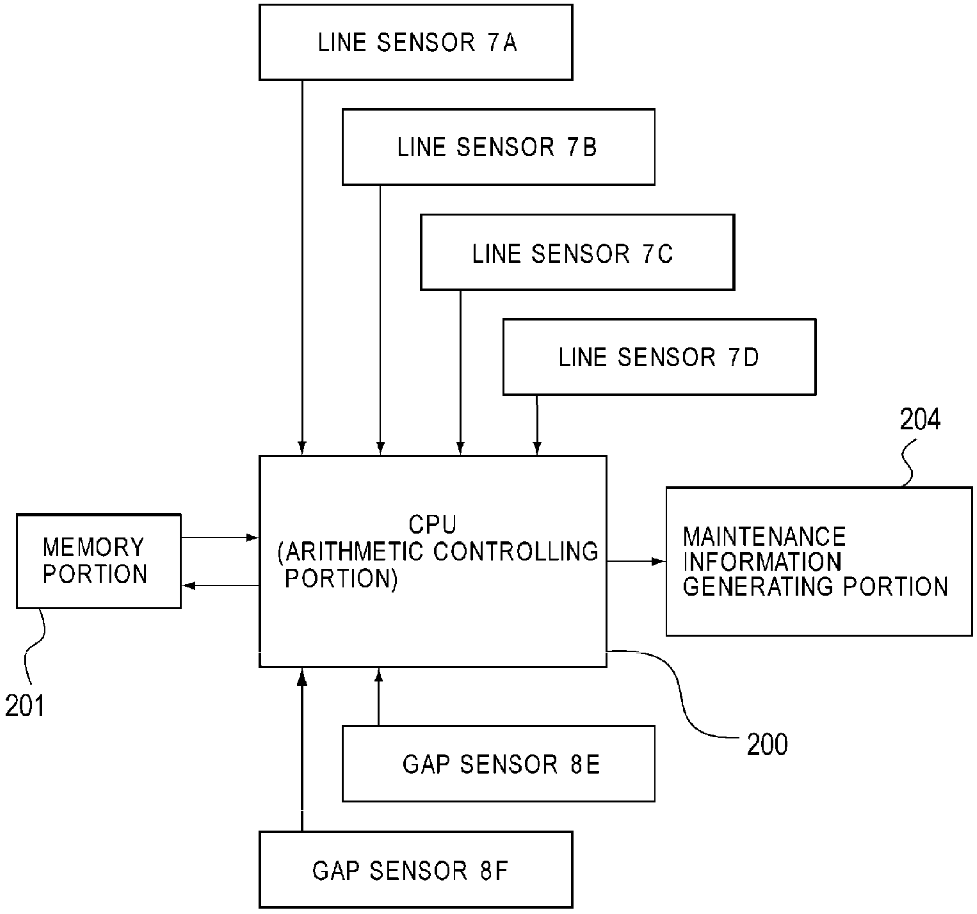
FIG. 12 is a control block diagram of an image forming apparatus according to a third embodiment of the present invention.

Next, a third embodiment of the invention will be described. FIG. 12 is a control block diagram of the image forming apparatus according to the embodiment. In FIG. 12, the same symbols as those in FIG. 5 represent the same or corresponding portions.

In FIG. 12, a maintenance information generating portion 204 generates maintenance prompting information when the typical distortion profile is larger than or equal to a predetermined size, i.e., the distortion of the toner image on the sheet is greater than or equal to a predetermined value. Since the maintenance prompting information is generated, maintenance personnel can take proper action when the toner image distortion increases due to a chronological change such as conveying roller wear.

Figure 13:
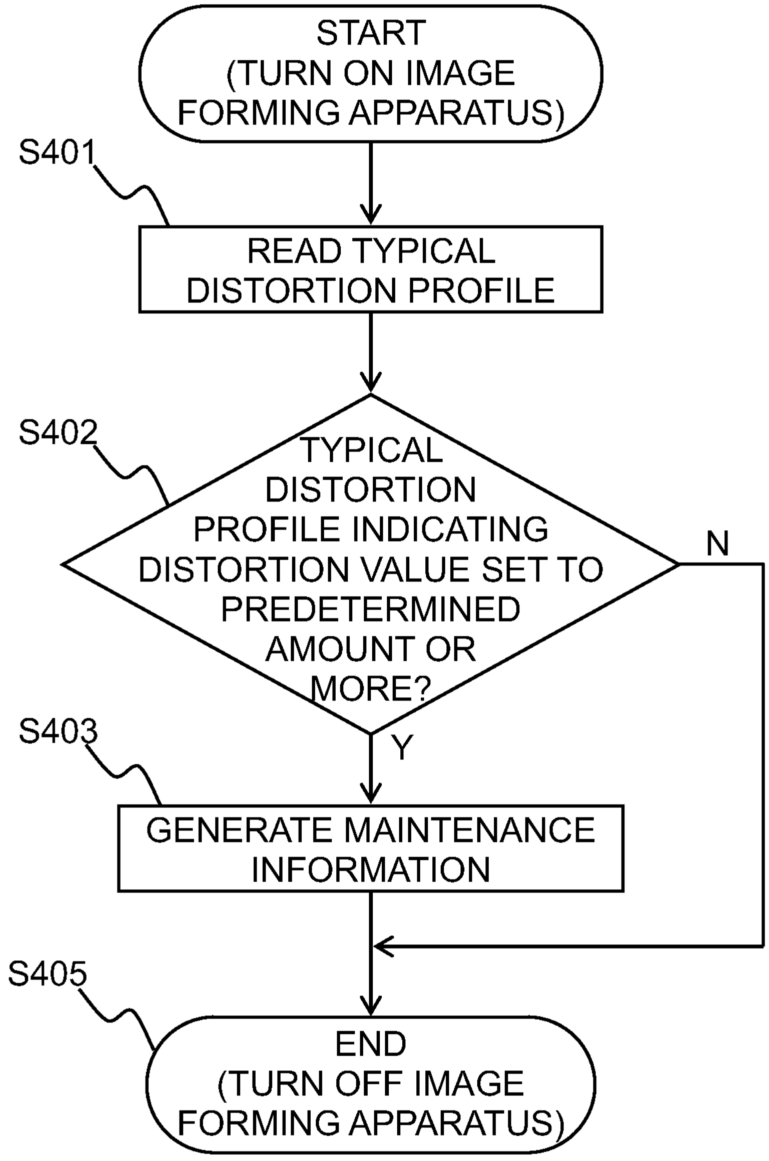
FIG. 13 is a flowchart illustrating a process of issuing information for prompting maintenance of the image forming apparatus.

The following describes a process of generating the maintenance prompting information with reference to a flowchart in FIG. 13.

When the image forming apparatus is turned on, the CPU 200 reads the typical distortion profile stored in the memory portion 201 (S401) as described above. The CPU 200 then determines whether the size (distortion value) of the typical distortion profile is greater than or equal to a predetermined value (S402). When the size of the typical distortion profile is greater than or equal to a predetermined value (Y at S402), the maintenance information generating portion 204 generates the maintenance prompting information (S403). The maintenance information is issued to a user or a service engineer when the horizontal registration misalignment of the toner image and the distortion of the toner image on the sheet due to skew are detected and are found to exceed allowable levels. The maintenance information remains generated until the image forming apparatus is turned off (S405).

The embodiment issues the maintenance information to a user or a service engineer so as to take appropriate action when the amount of distortion of the toner image on the sheet exceeds an allowable level. An excellent image can be maintained when a chronological change increases the toner image distortion. The information is provided so that maintenance personnel in charge of maintenance of the image forming apparatus can recognize the information. For example, the information is provided to an operation screen of the image forming apparatus or to a maintenance service location via network communication.

As has been previously described, the line sensors 7A and 7B and the gap sensor 8E function as a detector that continuously detects the horizontal registration position and the skew of the sheet passing through the secondary transfer portion 1F. The line sensors 7A and 7B and the gap sensor 8E are provided between the secondary transfer portion 1F and the pair of registration rollers 5. The line sensors 7C and 7D and the gap sensor 8F are provided between the secondary transfer portion 1F and the fixing device 6. The present invention is not limited thereto. The line sensor and the gap sensor may be provided at least one of between the secondary transfer portion 1F and the pair of registration rollers 5 and between the secondary transfer portion 1F and the fixing device 6.

As has been previously described, multiple line sensors are used as a unit that detects the horizontal registration position and the skew of the sheet in the sheet conveying direction. The invention is not limited thereto. The invention is applicable to any detection unit such as an area sensor using CCD so far as to be able simultaneously and continuously compute at least one registration position on a sheet and the skew in the sheet conveying direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-140229, filed Jun. 21, 2010, which is hereby incorporated by reference herein in its entirety.

What is claimed is:

1. An image forming apparatus having a transfer portion which transfers a toner image formed on an image bearing member to a sheet, comprising:

an upstream sheet conveying portion provided for the transfer portion upstream in a sheet conveying direction of the sheet;

a downstream sheet conveying portion provided for the transfer portion downstream in the sheet conveying direction;

a detector which is provided between the transfer portion and the upstream sheet conveying portion or between the transfer portion and the downstream sheet conveying portion, wherein said detector continuously detects one end position of a sheet in a direction perpendicular to a sheet conveying direction;

a controller which computes a distortion amount for a toner image transferred by the transfer portion to the sheet based on detection information from the detector;

a memory portion which saves the distortion amount for the toner image computed by the controller; and a correction portion which corrects a toner image formed on an image bearing member, wherein, when the controller receives image data for image formation on the sheet, the controller reads the distortion amount for the toner image saved in the memory portion and controls the correction portion so as to correct the toner image formed on the image bearing member based on the distortion amount for the toner image.

2. The image forming apparatus according to claim 1, wherein the detector is provided with a loop amount detector which detects a loop amount for a sheet passing through the transfer portion.

3. The image forming apparatus according to claim 1, wherein the correction portion generates maintenance information when determining that the computed distortion amount for the toner image becomes larger than or equal to a predetermined amount.

4. An image forming apparatus having a transfer portion which transfers a toner image formed on an image bearing member to a sheet, comprising:

an upstream sheet conveying portion provided for the transfer portion upstream in a sheet conveying direction of the sheet;

a downstream sheet conveying portion provided for the transfer portion downstream in the sheet conveying direction;

a detector which is provided between the transfer portion and the upstream sheet conveying portion or between the transfer portion and the downstream sheet conveying portion, wherein said detector continuously detects one end position of a sheet in a direction perpendicular to a sheet conveying direction;

a controller which computes a distortion amount for a toner image transferred by the transfer portion to the sheet based on detection information from the detector;

a memory portion which saves the distortion amount for the toner image computed by the controller; and a correction portion which corrects a sheet conveying direction of the upstream sheet conveying portion and the downstream sheet conveying portion, wherein, when the controller receives image data for image formation on the sheet, the controller reads the distortion amount for the toner image saved in the memory portion and controls the correction portion so as to correct a sheet conveying direction of the upstream sheet conveying portion and the downstream sheet conveying portion based on the distortion amount for the toner image.

5. The image forming apparatus according to claim 4, further comprising:

a skew adjusting portion which adjusts relative skew among the transfer portion, the upstream sheet conveying portion, and the downstream sheet conveying portion, wherein the correction portion controls the skew adjusting portion so as to correct a sheet conveying direction of the upstream sheet conveying portion and the downstream sheet conveying portion based on the distortion amount for the toner image saved in the memory portion.

6. The image forming apparatus according to claim 4, comprising:

a nip pressure adjusting portion which adjusts sheet nip pressure of the transfer portion, the upstream sheet conveying portion, and the downstream sheet conveying portion, wherein the correction portion controls the nip pressure adjusting portion so as to correct a sheet conveying direction of the upstream sheet conveying portion and the downstream sheet conveying portion based on the distortion amount for the toner image saved in the memory portion.

7. The image forming apparatus according to claim 4, wherein the detector is provided with a loop amount detector which detects a loop amount for a sheet passing through the transfer portion.

8. The image forming apparatus according to claim 4, wherein the correction portion generates maintenance information when determining that the computed distortion amount for the toner image becomes larger than or equal to a predetermined amount.

* * * * *